W. F. RAFFERTY.
BRAKE MECHANISM.
APPLICATION FILED SEPT. 29, 1920.

1,427,326.

Patented Aug. 29, 1922.

Inventor,
Wm. F. Rafferty
By C. J. Fetherstonhaugh
Atty.

UNITED STATES PATENT OFFICE.

WILLIAM FRANCIS RAFFERTY, OF TORONTO, ONTARIO, CANADA.

BRAKE MECHANISM.

1,427,326.  Specification of Letters Patent.  Patented Aug. 29, 1922.

Application filed September 29, 1920. Serial No. 413,633.

*To all whom it may concern:*

Be it known that I, WILLIAM FRANCIS RAFFERTY, a subject of the King of Great Britain, and resident of 188 Pacific Ave., in the city of Toronto, in the county of York, in the Province of Ontario, in the Dominion of Canada, have invented certain new and useful Improvements in Brake Mechanism, of which the following is a specification.

The invention relates to improvements in brake mechanism as described in the present specification and shown in the accompanying drawings that form a part of the same.

The invention consists essentially of the novel features of construction whereby brake members having flanges and track gripping projections are adjustably supported in advance of the wheels and operable from within the car.

The objects of the invention are to prevent skidding of the wheels and thus eliminate accidents, and generally to provide a brake mechanism which will be positive in its operation, inexpensive of construction, simple to manipulate and durable.

In the drawings Figure 1 is a side view of a portion of a car with the brake mechanism incorporated therewith, a portion of the car body being broken to disclose parts of said brake mechanism.

Like numerals of reference indicate corresponding parts in the various figures.

Figure 1:
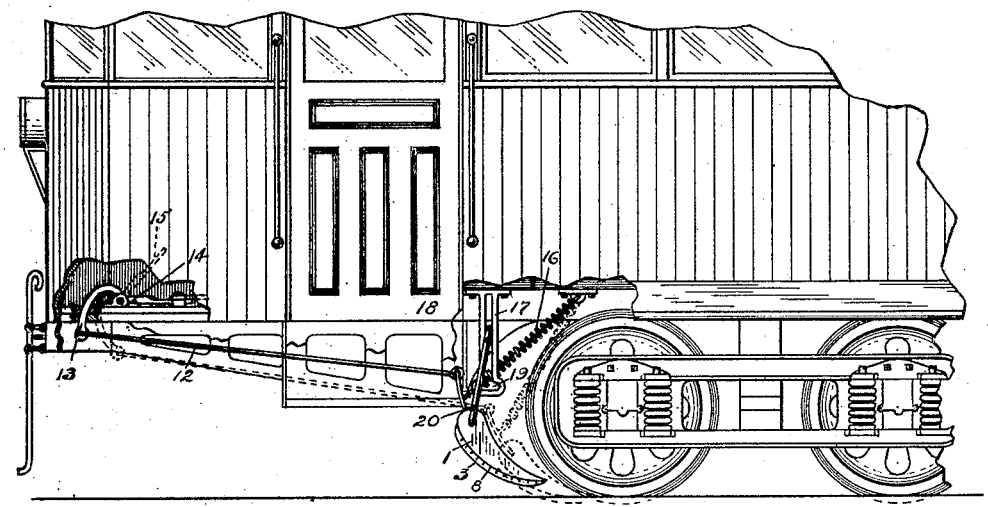
Figure 2:
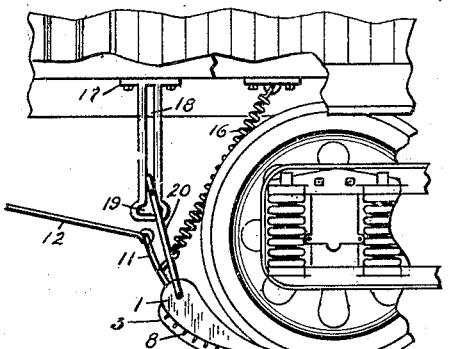
Figure 2 is a side elevation showing the position of the brake as it reaches the rail.
Figure 3:
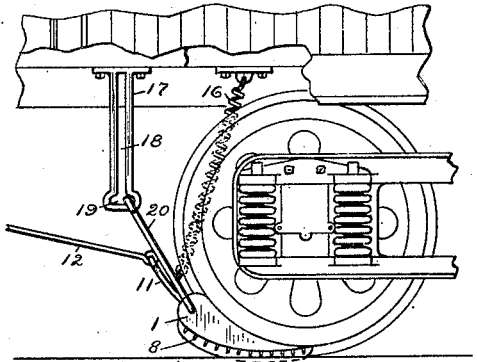
Figure 3 is a side view showing the brake in its operative position.
Figure 4:
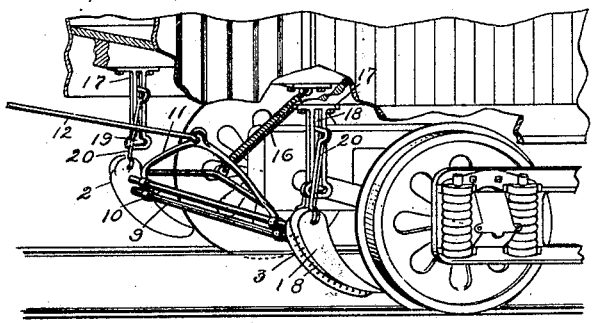
Figure 4 is a perspective view showing the brake in its inoperative position.
Figure 5:
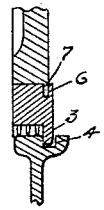
Figure 5 is a vertical sectional view through a portion of a car wheel, a brake member and a rail, showing the relative positions of these members with the brake in operative position.

Referring to the drawings 1 and 2 are the brake members each comprising an elongated wedge shaped block adapted for insertion between the wheel and the rail, each of said brake members being curved to conform substantially to the contour of a wheel and being provided with a flange 3 adapted to register with the groove 4 in the rails 5 and on its top side being provided with a longitudinal groove 6 adapted to receive the wheel flange 7.

8 are projections from the under sides of the brake members 1 and 2 for the purpose of producing friction to prevent said brake members from slipping along the rails.

9 and 10 are rods connecting the enlarged upper ends of the brake members and forming a support for an upawrdly extending yoke member 11 having incorporated therewith suitable means for connecting an operating rod thereto.

12 is a rod pivoted at one end to the yoke 11 and at its other end being pivotally secured to the lower end of a curved lever 13 which in turn is pivoted in a bracket 14 mounted on the car floor or in any other convenient location, said lever being operated by means of a handle 15 located within easy reach of the driver.

16 is a spring secured at one end on the under side of the car in substantially the transverse centre thereof and to the rear of the brake members when in their operative positions and at its other end being secured in any convenient manner to the brake members or the support therefor, said spring being for the purpose of exerting a rearward and upward pull on the brake members and serving both as a means for holding said brake members to their inoperative positions and to draw same rearwardly in their operative positions when released by means of the handle 15.

17 are brackets rigidly supported above the brake members and each being provided with a vertical slot 18 terminating in an enlarged portion 19 extending longitudinally in relation to the car body.

20 are links, each of which is secured to a brake member and projects upwardly and is slidable in the adjacent bracket 17, the slot in the upper end of each of said links being of similar shape to the enlarged portion 19 of said slots 17, said links forming sliding guide members for the purpose of holding the brake members to their proper positions.

In the operation of this invention the brake members are normally held to their inoperative position by means of the handle 15 which is provided with suitable locking means, the spring 16 exerting an upward pull on the brake members and constituting auxiliary holding means therefor, and when it is desired to employ said brakes it is only necessary to operate said handle to force the lower end of the curved lever 13 rearwardly which forces the rod 12 in a similar direction and as the links 20 connected to the brake members are slidable vertically in the brackets 17 the rearward motion transmitted to the rod 12 is transformed into a downward and rearward movement of the brake members drawing the pointed ends to the rails directly in advance of the wheels and causing said wheels to mount the brakes and consequently to cease rotating. As the brake members are provided with under flanges adapted to enter the rail grooves and with top grooves adapted to be engaged by the wheel flanges there is absolutely no possibility of lateral movement being imparted to said wheels to derail the car. As the car mounts the brake members said brake members are gradually rotated on their curved under sides until the wheels leave the rails entirely and the studded surface of said brakes bear the full weight thus creating enormous friction and preventing further forward movement of the car.

What I claim is:—

In brake mechanism, brake members comprising wedge shaped blocks, substantially arch shape in longitudinal section, said blocks being provided on their under sides with rail gripping studs and rail flanges and on their top sides being provided with wheel flange grooves, rods rigidly connecting the enlarged top ends of said brake members, a yoke secured to said rods, a rod pivoted centrally of said yoke and extending into the car, an operating lever pivoted to said rod and adapted on operation to move said brake members to and from their operative positions, vertically slotted brackets supported above said brakes, slotted links carried by said brake members and slidable in said brackets for guiding said brake members in movement to and from their operative positions, the slots in adjacent ends of said brackets and said links having lateral extensions and a spring secured to the connections between said brakes and to the car body and exerting upward and rearward pressure on said brakes.

Signed at the city of Toronto, this 3rd day of September, 1920.

WILLIAM FRANCIS RAFFERTY.

Witnesses:
  W. E. HAMMOND,
  G. MURPHY.